(12) United States Patent
Sundholm et al.

(10) Patent No.: US 9,051,968 B2
(45) Date of Patent: Jun. 9, 2015

(54) BEARING ISOLATOR ASSEMBLY

(71) Applicants: Brad S. Sundholm, Bay City, MI (US); William D. Cymbal, Freeland, MI (US); Kyle L. Collins, Saginaw, MI (US); Jason T. Rutkiewicz, Freeland, MI (US); Niklaus A. vonMatt, Midland, MI (US)

(72) Inventors: Brad S. Sundholm, Bay City, MI (US); William D. Cymbal, Freeland, MI (US); Kyle L. Collins, Saginaw, MI (US); Jason T. Rutkiewicz, Freeland, MI (US); Niklaus A. vonMatt, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/030,603

(22) Filed: Sep. 18, 2013

(65) Prior Publication Data

US 2014/0023302 A1    Jan. 23, 2014

Related U.S. Application Data (63) Continuation-in-part of application No. 13/690,643, filed on Nov. 30, 2012.

(60) Provisional application No. 61/581,886, filed on Dec. 30, 2011.

(51) Int. Cl.
*F16J 15/00* (2006.01)
*F16C 33/00* (2006.01)
(Continued)

(52) U.S. Cl.
CPC ............... *F16C 33/00* (2013.01); *F16C 25/04* (2013.01); *F16C 35/07* (2013.01); *F16C 19/527* (2013.01)

(58) Field of Classification Search
CPC .......... F16J 15/16; F16J 15/32; F16J 15/3208; F16J 15/3216
USPC .................... 277/500, 504, 508, 511
See application file for complete search history.

(56) References Cited

U.S. PATENT DOCUMENTS 3,589,701 A    6/1971   Gee
3,761,100 A *  9/1973   Taylor et al. .................. 277/373
(Continued)

FOREIGN PATENT DOCUMENTS

AU          504199 B2      10/1979
DE     102008037987 A1      3/2010
EP        2610509 A2       7/2013

OTHER PUBLICATIONS

European Search Report for Application No. 12 198 332.4 dated Feb. 10, 2014; 8 pages.
(Continued)

*Primary Examiner* — Kristina Fulton
*Assistant Examiner* — Nathan Cumar
(74) *Attorney, Agent, or Firm* — Cantor Colburn LLP (57) ABSTRACT

A bearing isolator assembly comprises an inner support member, an outer support member, a resilient member, an elastomeric ring, and a support cap disposed over a bearing surface defined by the inner support member or the outer support member. A path of travel is defined between the inner support member and the outer support member. The resilient member is disposed between the inner support member and the outer support member and is configured to resist compression between the inner support member and the outer support member within a first portion of the path of travel. The outer support member defines a ring envelope, in which the elastomeric ring is disposed. The inner support member defines a ring compression surface, and the elastomeric ring is configured to resist compression between the ring compression surface of the inner support member and the ring compression surface of the outer support member within a second portion of the path of travel.

13 Claims, 7 Drawing Sheets

(51) Int. Cl.
    *F16C 25/04*     (2006.01)
    *F16C 35/07*     (2006.01)
    *F16C 19/52*     (2006.01)

(56) References Cited

U.S. PATENT DOCUMENTS

| | | | |
|---|---|---|---|
| 4,998,997 A | | 3/1991 | Carlston |
| 5,205,384 A | | 4/1993 | Heshmat |
| 5,221,095 A | * | 6/1993 | Orlowski ............... 277/303 |
| 5,290,047 A | * | 3/1994 | Duffee et al. ............ 277/419 |
| 6,007,252 A | * | 12/1999 | Thelen et al. ............ 384/535 |
| 6,155,543 A | * | 12/2000 | Solomond et al. ........ 267/216 |
| 6,155,544 A | * | 12/2000 | Solomond et al. ........ 267/220 |
| 6,364,296 B1 | | 4/2002 | Cummings et al. |
| 7,163,206 B2 | * | 1/2007 | Cross et al. ............. 277/399 |
| 2008/0012188 A1 | | 1/2008 | Dickson |
| 2008/0197552 A1 | | 8/2008 | Winocur |

OTHER PUBLICATIONS

Partial EP Search Report issued Mar. 30, 2015 in corresponding EP Application No. 14183586.8.

* cited by examiner

BEARING ISOLATOR ASSEMBLY

RELATED APPLICATIONS

The present patent application is a continuation-in-part from U.S. Non-Provisional patent application Ser. No. 13/690,643 filed on Nov. 30, 2012, which claims the benefit of priority from U.S. Provisional Patent Application No. 61/581,886 filed on Dec. 30, 2011.

BACKGROUND OF THE INVENTION

The present invention relates to bearing isolators and more particularly to bearing isolators including a resilient member for providing a first force characteristic within a first range of travel and including an elastomeric member providing a second force characteristic within a second range of travel.

Existing bearing isolator assemblies seek to absorb manufacturing tolerances of associated components, pre-load bearings with axial loads to eliminate looseness and unwanted bearing noise, and control worm travel and rate of deceleration. Absorption of manufacturing tolerances of worm and bearing assemblies may be accomplished, while limiting travel of the components, by modulating a quantity of elastomer disposed within a pair of steel cups such that the elastomer compensates for part-to-part dimensional variations. In accordance with such methods, the shape of the cups and the shape of the elastomer are such that a specific force curve is generated when the assembly is compressed. Bearing pre-load is sought to be accomplished by applying an axial force to the inner race and resisting that force on the opposite side of the bearing on the outer race. Worm travel is controlled by limiting the amount of elastomer inside the two steel cups, and retention of conventional assemblies is provided through use of adhesives.

Unfortunately, such conventional bearing isolators may be limited in their ability to provide sufficient range of travel together with desirable force characteristics. Such bearing isolators may also lack the ability to be tuned so as to provide desirable force characteristics through necessary ranges of travel along the worm axis. Further, through use, some components of a bearing isolator, such as plastic components, may wear or creep, resulting in degradation of isolator function. Further still, some bearing isolator configurations may not provide for retention of isolator sub-components, in an assembled state during shipping. In the event that components of a bearing isolator may become dis-assembled during shipment, adding to costs downstream. Accordingly, it is desirable to have a bearing isolator providing tunable force characteristics over an increased range of travel, with improved durability in use and with improved reliability while being shipped and handled.

SUMMARY OF THE INVENTION

In an exemplary embodiment, a bearing isolator assembly comprises an inner support member, an outer support member, a resilient member, and an elastomeric ring. The outer support member is configured to cooperate with the inner support member so as to define a path of travel of the inner support member relative to the outer support member. The inner support member defines an inner spring seat directed toward the outer support member. The outer support member defines an outer spring seat directed toward the inner support member. The resilient member is disposed between the inner spring seat and the outer spring seat. The resilient member is configured to resist compression between the inner support member and the outer support member within a first portion of the path of travel. The outer support member defines a ring envelope, in which the elastomeric ring is disposed. The inner support member defines a ring compression surface directed toward the elastomeric ring, and the elastomeric ring is configured to resist compression between the ring compression surface of the inner support member and the ring compression surface of the outer support member within a second portion of the path of travel. The inner support member defines an inner bearing surface, and an inner support cap is disposed over the inner bearing surface.

In another aspect, a bearing isolator assembly comprises an inner support member, an outer support member, a resilient member, and an elastomeric ring. The outer support member is configured to cooperate with the inner support member so as to define a path of travel of the inner support member relative to the outer support member. The inner support member defines an inner spring seat directed toward the outer support member. The outer support member defines an outer spring seat directed toward the inner support member. The resilient member is disposed between the inner spring seat and the outer spring seat. The resilient member is configured to resist compression between the inner support member and the outer support member within a first portion of the path of travel. The outer support member defines a ring envelope, in which the elastomeric ring is disposed. The inner support member defines a ring compression surface directed toward the elastomeric ring, and the elastomeric ring is configured to resist compression between the ring compression surface of the inner support member and the ring compression surface of the outer support member within a second portion of the path of travel. The outer support member defines an outer bearing surface, and an outer support cap is disposed over the outer bearing surface.

In yet another aspect, a bearing isolator assembly comprises an inner support member, an outer support member, a resilient member, and an elastomeric ring. The outer support member is configured to cooperate with the inner support member so as to define a path of travel of the inner support member relative to the outer support member. The inner support member defines an inner spring seat directed toward the outer support member. The outer support member defines an outer spring seat directed toward the inner support member. The resilient member is disposed between the inner spring seat and the outer spring seat. The resilient member is configured to resist compression between the inner support member and the outer support member within a first portion of the path of travel. The outer support member defines a ring envelope, in which the elastomeric ring is disposed. The inner support member defines a ring compression surface directed toward the elastomeric ring, and the elastomeric ring is configured to resist compression between the ring compression surface of the inner support member and the ring compression surface of the outer support member within a second portion of the path of travel. The inner support member includes an inner member foot disposed distally from the inner bearing surface, and the outer support member includes an outer member foot disposed distally from the outer bearing surface. The outer member foot and the inner member foot are configured so as to cooperate to define a maximum limit of the range of travel of the bearing isolator assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, as variously shown in FIGS. 1-3 and 6, a bearing isolator assembly 100 includes an inner support member 102 and an outer support member 104. The inner support member 102 is disposed symmetrically about an inner support member axis 106 and defines an inner spring seat 108 and an inner bearing surface 110. The inner spring seat 108 and the inner bearing surface 110 are directed toward substantially opposite directions along the inner support member axis 106, with the inner spring seat 108 defining an internal direction 112 relative to the inner support member 102. The outer support member 104 is disposed symmetrically about an outer support member axis 114 and defines an outer spring seat 116 and an outer bearing surface 118. The outer spring seat 116 and the outer bearing surface 118 are directed toward substantially opposite directions along the outer support member axis 114, with the outer spring seat 116 defining an internal direction 120 relative to the outer support member 104.

The inner support member 102 defines an inner member guide surface 122 that extends along the internal direction 112 in parallel with the inner support member axis 106. The outer support member 104 defines an outer member guide surface 124 that extends along the internal direction 120 in parallel with the outer support member axis 114. When the inner support member 102 and the outer support member 104 are engaged with one another, the inner support member axis 106 is substantially aligned with the outer support member axis 114 to define a worm axis 126, with the inner spring seat 108 and the outer spring seat 116 facing substantially toward one another, and with the inner member guide surface 122 positioned in close proximity with the outer member guide surface 124.

It should be appreciated that the inner support member 102 and the outer support member 104 may each be formed primarily from a moldable plastic material such as polyvinyl chloride, polyethylene, or nylon. Portions of the inner support member 102 and the outer support member 104 that, when formed from plastic, may be susceptible to creep or structural failure through use may be reinforced or otherwise shielded by a member constructed of suitable material such as metal. For example, in applications where the inner bearing surface 110 of the inner support member 102 is to be disposed in use so as to bear against a hard (e.g., metal) surface of a bearing or other neighboring component, such that the inner support member 102, if constructed of plastic, might be susceptible to creep or may otherwise fail in that use, then it may be advantageous to dispose an inner support cap 160 (FIG. 6) comprising a hard material such as metal over the inner bearing surface 110 of the inner support member 102.

Figure 6:
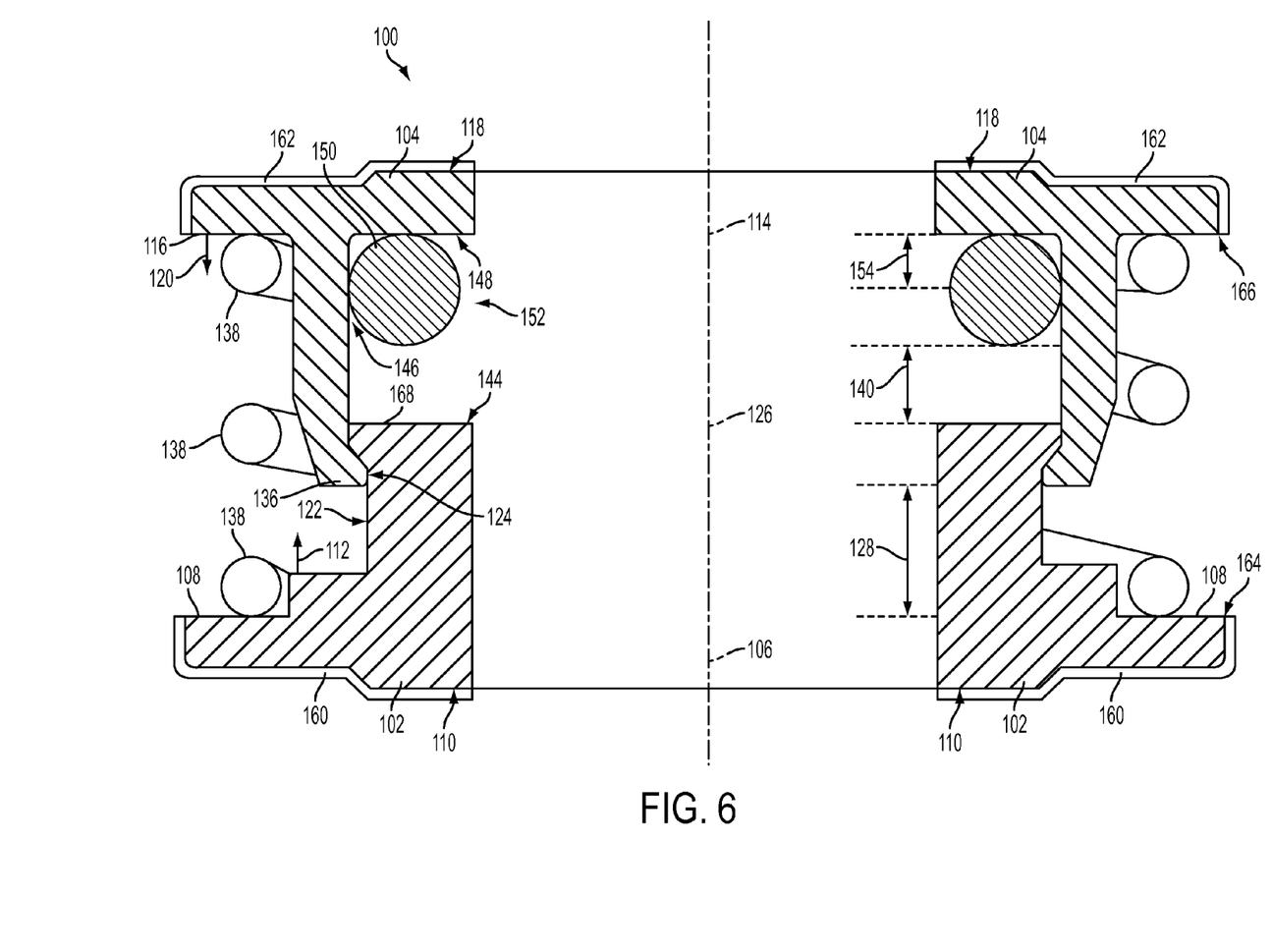
FIG. 6 is a cutaway drawing of an exemplary bearing isolator assembly in accordance with the invention.

To provide for retention of the inner support cap 160 against the inner bearing surface 110 of the inner support member 102, an outer radial dimension of the inner support cap 160 may be sized so that an interference fit is created between the inner support cap 160 and the outer radial surface 164 of the inner support member 102. Accordingly, the inner support cap 160 may be configured so as to provide a protective, hard surface for contacting an adjacent structure while also distributing loads bearing against the inner support member 102 and retaining the dimensions and shape of the inner support member 102. As a result, the inner support member 102 may be enabled to perform with reliability and durability even though it may be constructed of plastic, which may be better suited than metal for damping vibrations.

Similarly, in applications where the outer bearing surface 118 of the outer support member 104 is to be disposed in use so as to bear against a hard (e.g., metal) surface of a bearing or other neighboring component, such that the outer support member 104, if constructed of plastic, might be susceptible to creep or may otherwise fail in that use, then it may be advantageous to dispose an outer support cap 162 (FIG. 6) comprising a hard material such as metal over the bearing surface 118 of the outer support member 104.

To provide for retention of the outer support cap 162 against the outer bearing surface 118 of the outer support member 104, an outer radial dimension of the outer support cap 162 may be sized so that an interference fit is created between the outer support cap 162 and the outer radial surface 166 of the outer support member 104. Accordingly, the outer support cap 162 may be configured so as to provide a protective, hard surface for contacting an adjacent structure while also distributing loads bearing against the outer support member 104 and retaining the dimensions and shape of the outer support member 104. As a result, the outer support member 104 may be enabled to perform with reliability and durability even though it may be constructed of plastic, which may be better suited than metal for damping vibrations.

In an exemplary embodiment, the inner member guide surface 122 and the outer member guide surface 124 are configured so as to constrain the relative movement of the inner support member 102 relative to the outer support member 104. In an exemplary embodiment, the outer member guide surface 124 is configured for cooperating with the inner member guide surface 122 of the inner support member 102 so as to define a path of travel 128 of the outer support member 104 relative to the inner support member 102 along the worm axis 126.

In an exemplary embodiment, a cross-sectional shape of the inner member guide surface 122 is circular such that the inner support member 102 (and, if applicable, the inner support cap 160) may rotate about the worm axis 126 relative to the outer support member 104 (and, if applicable, the outer support cap 162) while the inner member guide surface 122 remains substantially engaged with the outer member guide surface 124. In an exemplary embodiment, the inner member guide surface 122 is cylindrical such that the outer member guide surface 124 remains substantially engaged with the inner member guide surface 122 as the inner support member 102 moves along the worm axis 126 relative to the outer support member 104.

In one exemplary embodiment, the inner member guide surface 122 is directed away from the inner support member axis 106, and the outer member guide surface 124 is directed toward the outer support member axis 114. In accordance with this exemplary embodiment, the inner member guide surface 122 is disposed at a radius equal to or slightly less than that of the outer member guide surface 124. In another exemplary embodiment, the inner member guide surface 122 is directed toward the inner support member axis 106, and the outer member guide surface 124 is directed away from the outer support member axis 114. In accordance with this exemplary embodiment, the inner member guide surface 122 is disposed at a radius equal to or slightly greater than that of the outer member guide surface 124.

In an exemplary embodiment, a bearing isolator assembly 100 includes one or more retention and/or alignment features to aid in assembly, alignment, and retention of the bearing isolator assembly 100 in a functional configuration and to further define a path of travel 128 for the bearing isolator assembly 100. For example, one of the inner support member 102 or the outer support member 104 may include one or more tabs extending therefrom while the other of the inner support member 102 or the outer support member 104 defines corresponding notches that facilitate passage of the tabs as the inner support member 102 moves relatively to the outer support member 104 in a particular orientation (i.e., a particular angular orientation about the worm axis 126 such that the tabs are aligned with the notches). Subsequently, the parts may be re-oriented (i.e., rotated relatively to one another about the worm axis 126) such that the tabs are no longer aligned with the notches and such that travel of the inner support member 102 relatively to the outer support member 104 may be limited along the worm axis 126.

In an exemplary embodiment, for example wherein the inner member guide surface 122 is directed away from the inner support member axis 106, the inner support member 102 includes one or more, and preferably three, notches 130 extending outwardly in a radial direction from the inner member guide surface 122 at an end of the inner member guide surface 122 distal from the inner spring seat 108. At an end of the outer member guide surface 124 distal from the outer spring seat 116, the outer support member 104 defines one or more corresponding tabs 132 to selectively facilitate assembly of the inner support member 102 with the outer support member 104 when the notches 130 and the tabs 132 are aligned and to impose a maximum limit on the path of travel 128 when the inner support member 102 is assembled into the outer support member 104 and the notches 130 are rotated about the worm axis 126 relative to the tabs 132.

In accordance with this embodiment, the outer support member 104 and/or the inner support member 102 is configured to provide clearance for travel of the tabs through a desired range of travel, such as between the inner member guide surface 122 and the outer support member 104, and between the outer member guide surface 124 (disposed at end of the outer support member 104 that is distal from the outer spring seat 116 along the outer support member axis 114) and the outer spring seat 116. The clearance region (i.e., the defined cavity) is configured so as to avoid interference between the tabs 132 and the structure of the relatively movable structure of the inner support member 102 or the outer support member 104 when the inner support member 102 and the outer support member 104 are disposed in an operational position defined within the path of travel 128. Relative to the clearance region, in an exemplary embodiment, the outer member guide surface 124 defines an outer member foot 136. The outer member foot 136 is characterized by a region of the outer support member 104 that defines the outer member guide surface 124. The inner member guide surface, the inner support member 102, the outer member foot 136, and the outer support member 104 are configured so as to define a maximum limit to the range of positions that are operational (i.e., the operational positions) defined within path of travel 128.

It should be appreciated that, in another exemplary embodiment, the inner member guide surface 122 is directed toward the inner support member axis 106, and the inner support member 102 includes one or more, and preferably three, notches 130 that extend inwardly toward the inner support member axis 106 from the inner member guide surface 122 at an end of the inner member guide surface 122 distal from the inner spring seat 108. In accordance with this embodiment, at an end of the outer member guide surface 124 distal from the outer spring seat 116, the outer support member 104 defines one or more corresponding tabs 132 to selectively facilitate assembly of the inner support member 102 into the outer support member 104 when the notches 130 and the tabs 132 are aligned and to impose a maximum limit to the range of operational positions defined within on the path of travel 128 when the inner support member 102 is assembled into the outer support member 104 and the notches 130 are rotated about the worm axis 126 relative to the tabs 132. It should also be appreciated that the placement of the tabs and the notches may be changed from one part to the other.

In accordance with this embodiment, the outer support member 104 is configured to define a clearance region between the inner member guide surface 122 and the outer support member 104 between the outer member guide surface 124 and the outer spring seat 116. The clearance region is configured to provide clearance to avoid interference between the notches 130 and the outer support member 104 when the inner support member 102 and the outer support member 104 are disposed within the operational range of positions defined within path of travel 128. Relative to the clearance region, the outer member guide surface 124, therefore, defines an outer member foot 136. The notches 130 and the outer member foot 136 are configured so as to define a maximum limit to the path of travel 128.

A resilient member 138 is disposed between the inner spring seat 108 and the outer spring seat 116. The resilient member 138 is configured to accommodate compression between the inner support member 102 and the outer support member 104 within a first portion 140 of the path of travel 128. The resilient member 138 may comprise a coil spring or any other structure configured and arranged for resisting compression along the worm axis 126 between the inner support member 102 and the outer support member 104.

In an exemplary embodiment, the resilient member 138 is a metallic coil spring configured so as to provide a force of between approximately two Newtons and approximately 100 Newtons as the resilient member 138 is compressed in connection with the movement of the inner support member 102 relative to the outer support member 104 along a first portion 140 of the path of travel 128 corresponding to a worm axis stroke (i.e., operational range within the path of travel 128) that is between approximately 0 mm to approximately 5 mm.

In another exemplary embodiment, the resilient member 138 is configured so as to provide a force of between approximately 5 Newtons and approximately 100 Newtons as the resilient member 138 is compressed in connection with the movement of the inner support member 102 relative to the outer support member 104 along a first portion 140 of the path of travel 128 corresponding to a worm axis stroke of between approximately 0 mm and approximately 2 mm.

In an exemplary embodiment, the inner support member 102 defines a ring compression surface 144 that is disposed proximate the distal end of the inner member guide surface 122 at a compression ring radius about the inner support member axis 106. The ring compression surface 144 is disposed so as to face along the internal direction 112 of the inner support member 102. The outer support member 104 defines an outer ring seat 148 that is disposed at a radius that is approximately equal to the compression ring radius and that faces along the internal direction 120 of the outer support member 104. In an exemplary embodiment, the outer ring seat 148 extends radially inward from the outer spring seat 116. In an exemplary embodiment, the outer support member 104 also defines an axial ring compression wall 146. The ring compression wall 146 may be disposed substantially in parallel to the outer support member axis 114, adjacent to the outer ring seat 148, and orthogonal to the outer ring seat 148. The outer ring seat 148 and the axial ring compression wall 146 cooperate to define a ring envelope 152.

An elastomeric ring 150 is disposed on the outer ring seat 148 or, in an exemplary embodiment, retained within the ring envelope 152 of the outer support member 104. When the inner support member 102 and the outer support member 104 are engaged with one another, the ring compression surface 144 positioned for contact with, and compression of, the elastomeric ring 150 between the outer ring seat 148 and the ring compression surface 144 as the inner support member 102 moves relative to the outer support member 104 along the worm axis 126 within a second portion 154 of the path of travel 128.

In an exemplary embodiment, the elastomeric ring 150 is a tubular elastomer arranged as a ring and configured so as to provide a force of between approximately 0 Newtons and approximately 2000 Newtons as the elastomeric ring 150 is compressed in connection with the movement of the inner support member 102 relative to the outer support member 104 along the second portion 154 of the path of travel 128 corresponding to a worm axis stroke of from approximately 5 mm to approximately 5.5 mm.

In an exemplary embodiment, the first portion 140 of the path of travel 128 includes the second portion 154 of the path of travel 128 such that the force produced by the elastomeric ring 150 so as to resist compressive movement of the inner support member 102 relative to the outer support member 104 along the worm axis 126 within the second portion 154 of the path of travel 128 is reinforced by the force produced by the resilient member 138 within the second portion 154 of the path of travel 128.

The resilient member 138 is configured and arranged so as to provide a first biasing force characteristic 156 urging the inner support member 102 apart from the outer support member 104. The elastomeric ring 150 is configured and arranged so as to provide a second biasing force characteristic 158 urging the inner support member 102 apart from the outer support member 104. Axial loading of the bearing isolator assembly, as supported by the combination of the first biasing force characteristic 156 and the second biasing force characteristic 158 inhibits relative rotational movement between the inner support member 102 and the outer support member 104.

In an exemplary embodiment, as shown in FIG. 6, the inner support member 102 includes an inner member foot 168 disposed at an end of the inner support member 102 that is distal from the inner bearing surface 110, adjacent to the ring compression surface 144. The inner member foot 168 extends in a direction radially outward (i.e., away from the worm axis 126) from the inner member guide surface 122. Correspondingly, the outer support member 104 includes an outer member foot 136 disposed at an end of the outer support member 104 that is distal from the outer bearing surface 118. The outer member foot 136 extends in a direction radially inward (i.e., toward the worm axis 126) from the ring compression wall 146 so as to extend radially inward relative to the radially outward extent of the inner member foot. Accordingly, the outer member foot 136 and the inner member foot 168 are configured so as to cooperate such that, the inner support member 102 may be engaged to the outer support member 104 by compressing the inner support member 102 against the outer support member 104 so that such compression causes the outer member foot 136 to deform in a radially outward direction away from the worm axis 126 while the inner member foot 168 deforms in a radially inward direction toward the worm axis 126.

When the inner member foot 168 and the outer member foot 136 have deformed sufficiently, the inner support member 102 and the outer support member 104 may move toward one another along the worm axis 126 as the inner member foot 168 and the outer member foot 136 pass one another. Upon sufficient travel toward one another, coupled with compression of the resilient member 138, the inner member foot 168 and the outer member foot 136 no longer cause one another to deform radially. In a sense, the outer support member 104 may be said to "pop" over the inner support member 102 as the two are being assembled. Thereafter, the inner member foot 168 and the outer member foot 136 cooperate so as to limit expansion of the bearing isolator assembly 100 along the worm axis 126, thereby providing for stable retention of the bearing isolator assembly 100 in an assembled state.

Thus, the outer member foot 136 and the inner member foot 168 are configured such that the inner support member 102 may be engaged to the outer support member 104 by compressing the inner support member 102 against the outer support member 104 so that an interference between the outer member foot 136 and the inner member foot 168 causes the outer member foot 136 to deform in a radially outward direction while the inner member foot 168 deforms in a radially inward direction.

Further, the inner member foot 168 and the outer member foot 136 are configured such that, when the inner member foot 168 and the outer member foot 136 have deformed to a bypass state (i.e., where the inner member foot 168 and the outer member foot 136 have deformed sufficiently), the inner member foot 168 and the outer member foot 136 may pass one another along the worm axis 126, enabling the inner support member 102 and the outer support member 104 to move along the worm axis 126 toward an engaged relationship relative to one another.

In an exemplary embodiment, the inner member foot 168 and the outer member foot 136 are mutually configured so that, once the inner support member 102 and the outer support member 104 have moved sufficiently toward one another, the inner member foot 168 will have travelled past the outer member foot 136 such that the inner member foot 168 and the outer member foot 136 shall no longer be required to deform radially. Further, the inner member foot 168 and the outer member foot 136 may be mutually configured so that once the inner support member 102 and the outer support member 104 are in an engaged state, the inner member foot 168 and the outer member foot 136 cooperate so as to limit expansion of the bearing isolator assembly along the worm axis. The ability to move toward engagement while preventing disengagement may be provided by the appropriate angling of the leading and trailing surfaces of the inner member foot 168 and the outer member foot 136 such that engagement of the surfaces with one another results in biasing in the desired radial direction (e.g., toward one another so as to prevent disengagement, and apart so as to facilitate engagement).

Figure 7:
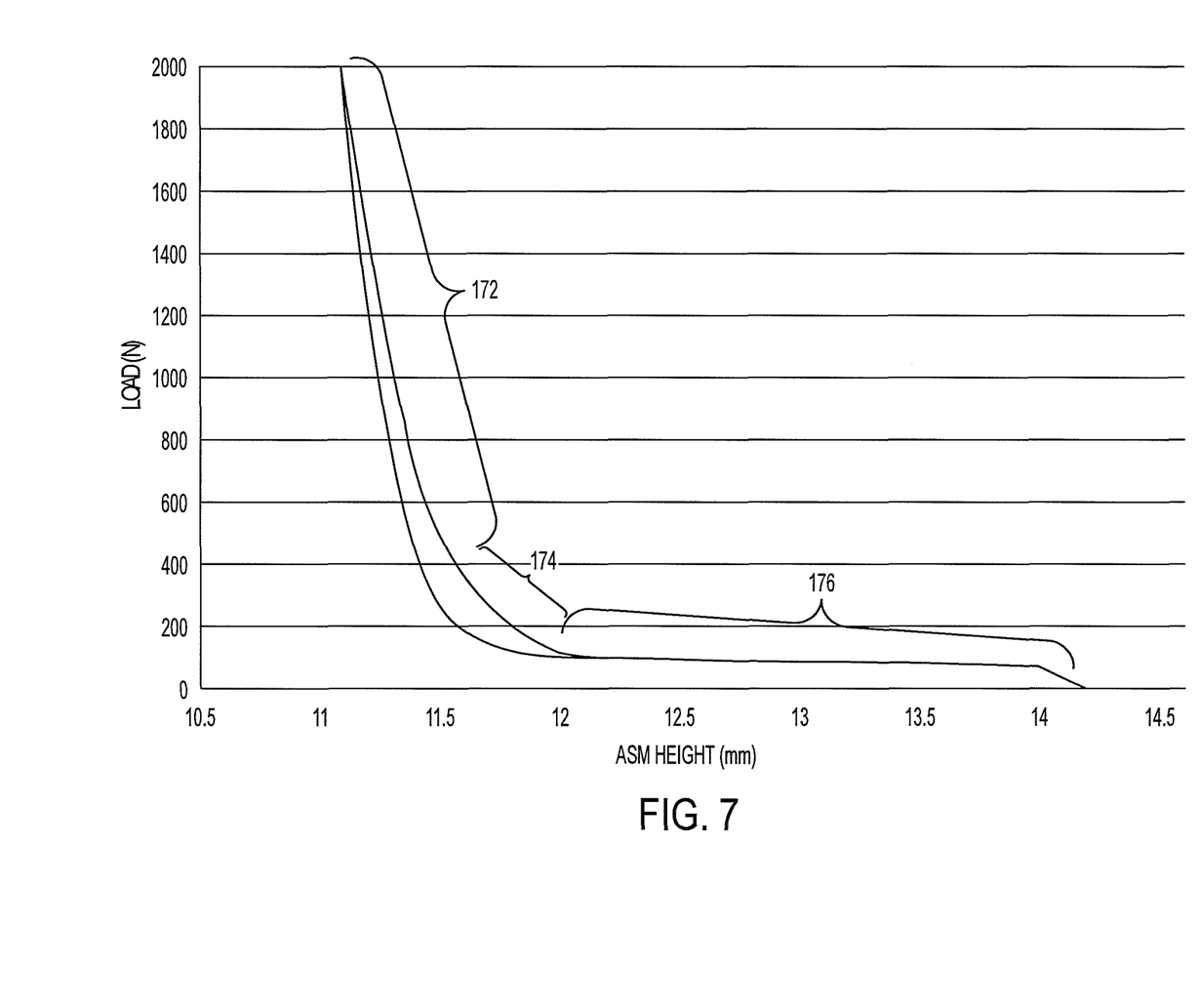
FIG. 7 is a graph of an exemplary relationship between assembly height and load for an exemplary bearing isolator assembly.

FIG. 7 is a graph of an exemplary relationship between assembly height and load for an exemplary bearing isolator assembly. As shown in FIG. 7, as an exemplary bearing isolator assembly 100 is compressed through a range of assembly heights from approximately 14 mm to approximately 12 mm, corresponding to a first range of motion 176, which may be configured for compensating for tolerances in adjacent components along the worm axis 126, a load exerted by the resilient member 138 increases in a relatively linear fashion according to a relatively low spring constant associated with compression of the resilient member 138.

In the range of assembly heights between about 12 mm and 11.5 mm, the elastomeric ring 150 will be in contact with both the ring compression surface 144 and the outer ring seat 148 and will experience cross-sectional deformation as its cross-sectional shape changes so as to conform to the shape of the volume between the ring compression surface 144 and the outer ring seat 148. This second range of motion (i.e., range of assembly heights) 174 is associated with a deceleration in the rate of travel along the worm axis 126.

Finally, as the assembly height continues to decrease beyond a point at which the elastomeric ring 150 has deformed so as to substantially occupy most or all of the available volume between the ring compression surface 144 and the outer ring seat 148, the load exerted by the elastomeric ring 150 on the bearing isolator assembly 100 increases significantly. In the illustrated embodiment, compression of the bearing isolator assembly 100 in a third range of motion 172 associated with a limitation on travel along the worm axis 126, between 11.2 mm and 11 mm, corresponds to an increase in load from approximately 500 N to approximately 2000 N.

Accordingly, in an exemplary embodiment, an improved bearing isolator assembly 100 absorbs manufacturing tolerances of adjacent structures such as bearings while providing increased free height and allowing for greater duration of loading. As a result, conventional disadvantages such as noise and vibration may be effectively mitigated. A bearing isolator assembly 100 also enables pre-loading of associated bearings while being tunable as desired through modifications to either or both of the resilient member 138 and the elastomeric ring 150.

Figure 1:
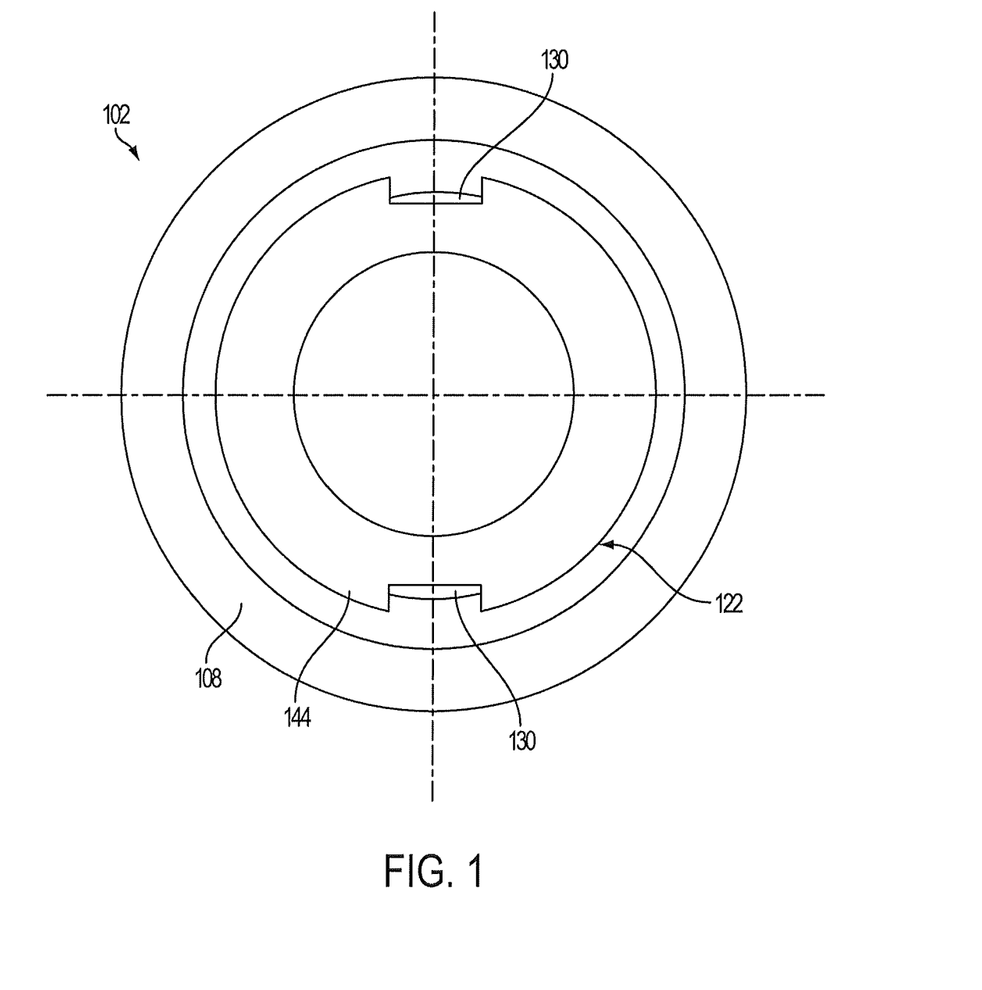
FIG. 1 is a drawing of a portion of an exemplary bearing isolator assembly in accordance with the invention.
Figure 2:
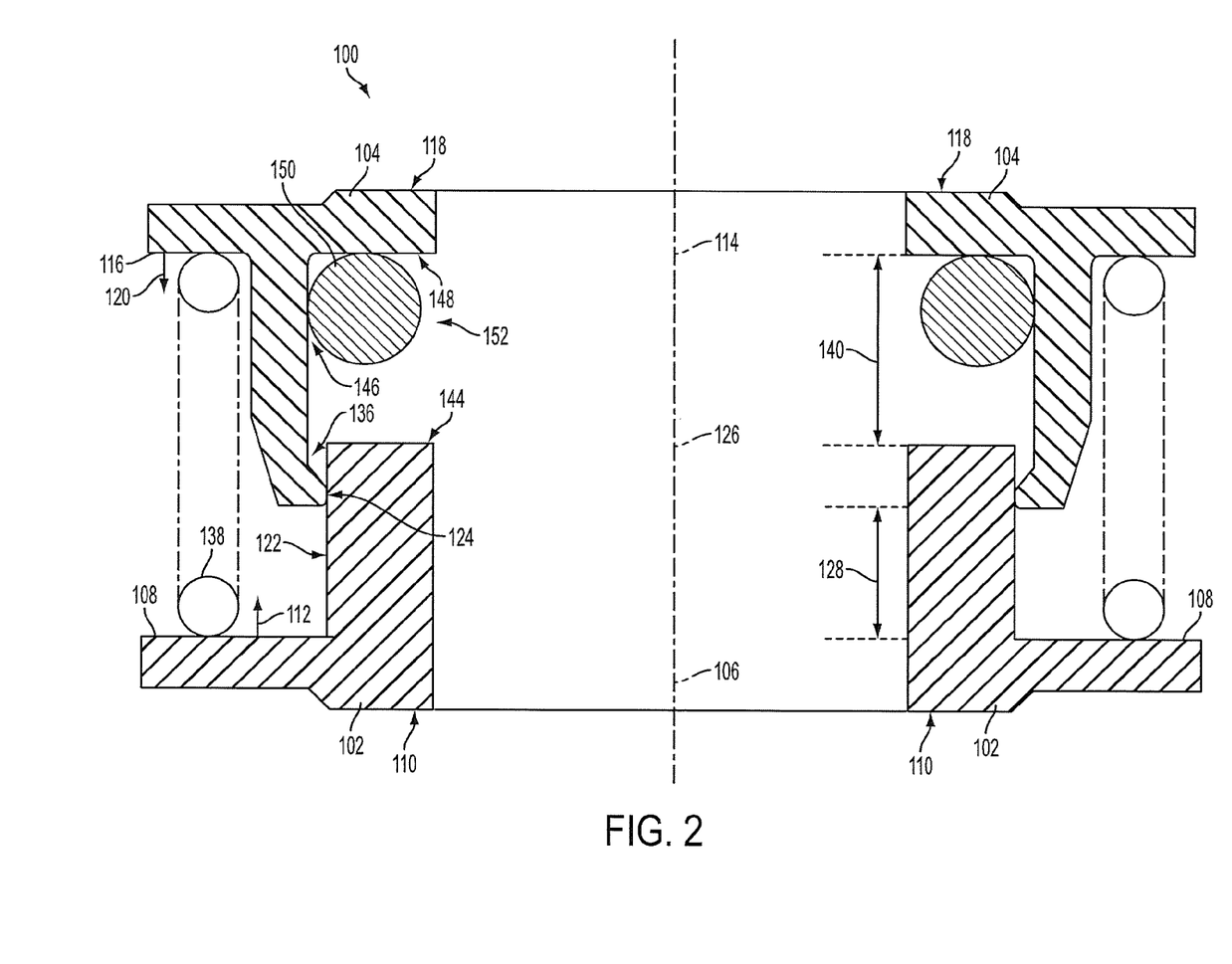
FIG. 2 is a cutaway drawing of an exemplary bearing isolator assembly in accordance with the invention.
Figure 3:
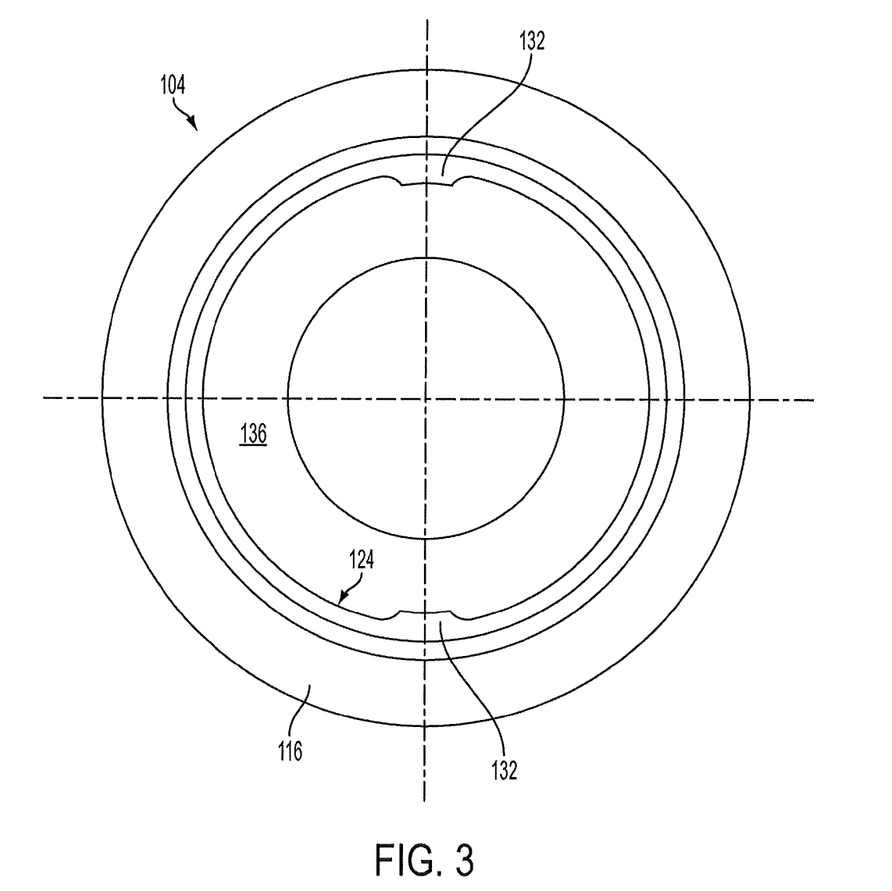
FIG. 3 is a drawing of a portion of an exemplary bearing isolator assembly in accordance with the invention.
Figure 4:
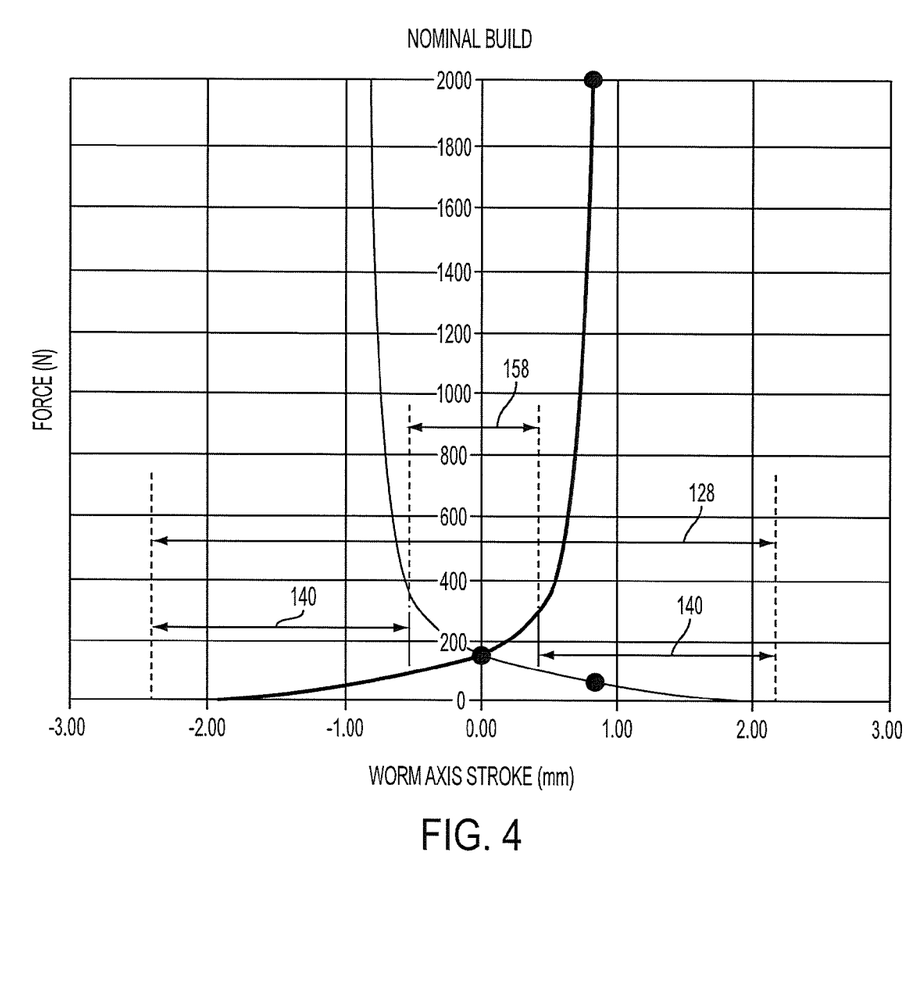
FIG. 4 is a graph of an exemplary relationship between worm axis stroke and isolator force for an exemplary bearing isolator assembly.
Figure 5:
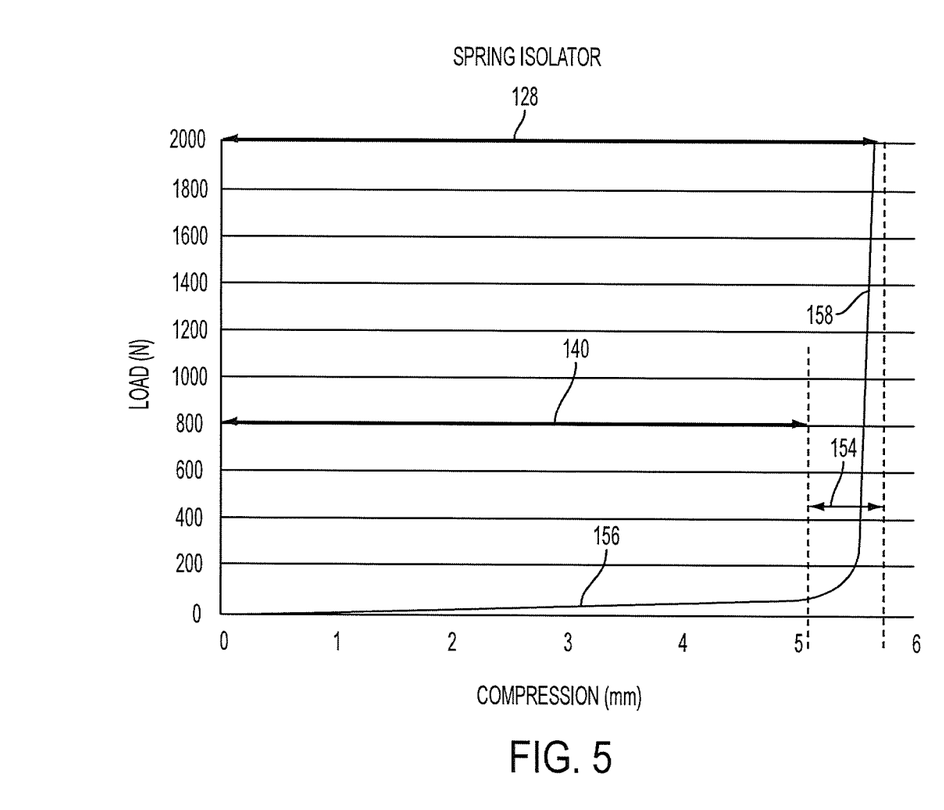
FIG. 5 is a graph of an exemplary relationship between worm axis stroke and isolator force for an exemplary bearing isolator assembly.

For example, the bearing pre-load can be altered by changing the resilient member 138 with one having a greater or lesser spring constant. Worm axis 126 turning torque is also a tunable function of this design. Not only can the force of the resilient member 138 be altered, the material properties and volume and surface characteristics of the elastomer can be changed to satisfy varying conditions. All three stages of the spring force curves shown on FIG. 4, FIG. 5, and FIG. 7 can be altered/tuned to accommodate worm travel and rate of deceleration. Thus, a bearing isolator includes a resilient member 138 for providing a first force characteristic within a first range of travel and also includes an elastomeric member providing a second force characteristic within a second range of travel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A bearing isolator assembly comprising:
   an inner support member;
   an outer support member defining an outer bearing surface, the outer support member configured to cooperate with the inner support member so as to define a path of travel of the inner support member relative to the outer support member;
   a resilient member; and
   an elastomeric ring;
   wherein the inner support member defines an inner spring seat directed toward the outer support member, the outer support member defines an outer spring seat directed toward the inner support member, the resilient member is disposed between the inner spring seat and the outer spring seat, and the resilient member is configured to resist compression between the inner support member and the outer support member within a first portion of the path of travel;
   wherein the outer support member defines a ring envelope, the elastomeric ring is disposed in the ring envelope, the inner support member defines a ring compression surface directed toward the elastomeric ring, and the elastomeric ring is configured to resist compression between the ring compression surface of the inner support member and the ring compression surface of the outer support member within a second portion of the path of travel;
   wherein the inner support member includes an inner member foot extending radially outward from an inner member guide surface at an end of the inner member guide surface distal from the inner spring seat;
   wherein the outer support member includes an outer member foot extending radially inward from an outer member guide surface at an end of the outer member guide surface distal from the outer spring seat; and
   wherein the inner member foot and the outer member foot are configured to engage each other to facilitate preventing movement of the outer support member and the inner support member away from each other.

2. The bearing isolator assembly of claim 1, wherein the inner support member comprises plastic.

3. The bearing isolator assembly of claim 1, wherein the outer support member comprises plastic.

4. The bearing isolator assembly of claim 1, wherein when the resilient member is uncompressed, the outer member foot directly contacts the inner member foot.

5. The bearing isolator assembly of claim 1, wherein the inner support member and the outer support member are each disposed about a common worm axis, and wherein the inner member foot is disposed between the outer member foot and the elastomeric ring along a direction parallel to the worm axis, and wherein the outer member foot is disposed between the inner member foot and the inner bearing surface along the direction parallel to the worm axis.

6. The bearing isolator assembly of claim 1, wherein the inner support member includes an annular portion having an outer diameter defined by the inner member guide surface;
   wherein the outer support member includes an annular portion having an outer diameter defined by the outer member guide surface; and
   wherein the outer diameter of the inner support member annular portion is less than the outer diameter of the outer support member annular portion such that the inner support member annular portion is disposed inside the outer support member annular portion.

7. A bearing isolator assembly comprising:

an inner support member;

an outer support member configured to cooperate with the inner support member so as to define a path of travel of the inner support member relative to the outer support member;

a resilient member; and an elastomeric ring;

wherein the inner support member defines an inner spring seat directed toward the outer support member, the outer support member defines an outer spring seat directed toward the inner support member, the resilient member is disposed between the inner spring seat and the outer spring seat, and the resilient member is configured to resist compression between the inner support member and the outer support member within a first portion of the path of travel;

wherein the outer support member defines a ring envelope, the elastomeric ring is disposed in the ring envelope, the inner support member defines a ring compression surface directed toward the elastomeric ring, and the elastomeric ring is configured to resist compression between the ring compression surface of the inner support member and the ring compression surface of the outer support member within a second portion of the path of travel;

wherein the inner support member includes an inner member foot disposed distally from the inner bearing surface;

wherein the outer support member includes an outer member foot disposed distally from the outer bearing surface;

wherein the outer member foot and the inner member foot are configured so as to contact each other to define a maximum limit of the range of travel of the inner support member from the outer support member along a common worm axis; and wherein the outer member foot contacts the inner support member, and the inner member foot contacts the outer support member.

8. The bearing isolator assembly of claim 7, wherein the inner member foot extends in a direction radially outward from an inner member guide surface, and wherein the outer member foot extends in a direction radially inward from the ring compression wall so as to extend radially inward relative to the radially outward extent of the inner member foot.

9. The bearing isolator assembly of claim 7, wherein the outer member foot and the inner member foot are configured such that the inner support member may be engaged to the outer support member by compressing the inner support member against the outer support member so that such compression causes the outer member foot to deform in a radially outward direction while the inner member foot deforms in a radially inward direction.

10. The bearing isolator assembly of claim 7, wherein the inner member foot and the outer member foot are configured such that, when the inner member foot and the outer member foot have deformed to bypass each other, the inner member foot and the outer member foot may pass one another along the worm axis, enabling the inner support member and the outer support member to move toward an engaged relationship relative to one another along the worm axis.

11. The bearing isolator assembly of claim 7, wherein the inner member foot and the outer member foot are mutually configured so that, once the inner support member and the outer support member have moved sufficiently toward one another, the inner member foot has travelled past the outer member foot such that the inner member foot and the outer member foot are no longer required to deform radially.

12. The bearing isolator assembly of claim 7, wherein the inner member foot and the outer member foot are mutually configured so that once the inner support member and the outer support member are in an engaged state, the inner member foot and the outer member foot cooperate so as to limit expansion of the bearing isolator assembly along the worm axis.

13. The bearing isolator assembly of claim 7, wherein the outer member foot directly contacts the inner support member and the inner member foot directly contacts the outer support member.

* * * * *